(12) United States Patent
Lucas

(10) Patent No.: US 6,776,394 B2
(45) Date of Patent: Aug. 17, 2004

(54) PENDULUM VALVE ASSEMBLY

(75) Inventor: Paul D. Lucas, Melrose, MA (US)

(73) Assignee: MKS Instruments, Inc., Wilmington, DE (US)

(*) Notice: Subject to any disclaimer, the term of this patent is extended or adjusted under 35 U.S.C. 154(b) by 54 days.

(21) Appl. No.: 10/334,088

(22) Filed: Dec. 30, 2002

(65) Prior Publication Data

US 2004/0124392 A1 Jul. 1, 2004

(51) Int. Cl.$^7$ ................................. F16K 3/04
(52) U.S. Cl. .................. 251/259; 251/203; 251/301
(58) Field of Search ................... 251/301, 259, 251/257, 203, 204, 129.11, 228

(56) References Cited

U.S. PATENT DOCUMENTS

| | | | | |
|---|---|---|---|---|
| 3,973,753 A | * | 8/1976 | Wheeler | 251/204 |
| 4,089,505 A | * | 5/1978 | Anderle et al. | 251/129.11 |
| 4,219,183 A | * | 8/1980 | Hoffmann et al. | 251/187 |
| 5,577,707 A | * | 11/1996 | Brida | 251/193 |
| 6,089,537 A | * | 7/2000 | Olmsted | |
| 6,161,576 A | * | 12/2000 | Maher | |
| 6,328,051 B1 | * | 12/2001 | Maher | |
| 6,409,149 B1 | * | 6/2002 | Maher | |
| 6,464,203 B1 | * | 10/2002 | Ishigaki et al. | 251/301 |

FOREIGN PATENT DOCUMENTS

GB 1111281 * 4/1968

OTHER PUBLICATIONS

Vatvalve.Series 16, pp. 46–49. VAT Vakuumventile AG, CH–9649 Haag, Switzerland.*

* cited by examiner

Primary Examiner—John Bastianelli
(74) Attorney, Agent, or Firm—McDermott,Will & Emery LLP

(57) ABSTRACT

A valve assembly including a housing having an opening defined by a valve seat, a valve body movable within the housing between a completely opened position disengaged from the valve seat and a completely closed position engaging the valve seat, and a sleeve movable longitudinally along, and rotatably about, a longitudinal axis. The sleeve is connected to the valve body so that the valve body can rotate and move longitudinally with the sleeve. One of the housing and the sleeve includes a cam surface, and the other of the housing and the sleeve includes a cam follower received by the cam surface. A rotatable shaft is in threaded engagement with the sleeve so that rotation of the shaft causes at least one of rotation and longitudinal movement of the sleeve against the cam follower.

24 Claims, 5 Drawing Sheets

PENDULUM VALVE ASSEMBLY

FIELD OF THE INVENTION

The present invention relates generally to pendulum or gate valve assemblies, and more particularly to a pendulum valve assembly including a new and improved arrangement providing both rotary and axial motion to a flapper of the pendulum valve assembly.

BACKGROUND OF THE INVENTION

A pendulum valve assembly generally includes a housing containing a pendulum valve and including an interior space and a pair of openings through which gaseous fluid can enter and exit the interior space. Pendulum valve assemblies are particularly useful in high purity gas delivery systems, such as those used in semiconductor manufacturing or other thin film coating processes. As its name implies, a pendulum valve pivots between open and closed positions, and includes a valve body, which is usually provided as a disk or flapper, connected to a rotatably shaft by a pivot arm. In a completely opened position the disk of the pendulum valve is moved out of the flow path defined by the openings so that fluid can enter and exit the interior space of the housing, while in a completely closed position the disk is moved into sealing contact with a valve seat surrounding one of the openings so that fluid can not enter the interior space.

The movement of the disk usually requires rotational (i.e., pivotal or lateral) movement between the completely opened position and an intermediate position, and then at least some longitudinal (i.e., translational, linear or axial) movement from the intermediate position to the completely closed position where the disk is in sealing contact with the valve seat. In order to obtain this combination of rotational and translational movement, some prior pendulum valves have typically used multiple actuator elements.

In addition, in a "standard" type gate or pendulum valve, as the gate starts to clear the opening of the valve housing, the gas flow increases rapidly. Also, since there is commonly an overlap between the gate and the opening (i.e., gate is a larger diameter than the opening), initial movement of the gate results in little if any change in flow. Thus, the overall conductance includes very little change in flow followed by a very rapid change in flow (and vice versa as the gate is closed), which results in poor control of flow (conductance) in this operating range of the valve.

U.S. Pat. No. 6,089,537 to Olmsted, which is assigned to the assignee of the present invention and incorporated herein by reference, discloses an improved pendulum valve assembly that uses a simple rotating cam mechanism that precisely controls the rotational and longitudinal movement of the valve body between a completely opened position and a completely closed position. U.S. Pat. Nos. 6,161,576, 6,328,051 and 6,409,149, which are all assigned to the assignee of the present invention and incorporated herein by reference, also disclose improved pendulum valve assemblies and systems.

What is further desired, however, is a new and improved pendulum valve assembly including a new and improved arrangement for providing both rotational and longitudinal movement of a disk of the valve assembly between a closed and an opened position. Preferably, a resolution of the longitudinal movement of the arrangement can be chosen independently of a resolution of the rotational movement. What is also desired, is a new and improved pendulum valve assembly that provides a more controllable and consistent change in conductance through the valve assembly during opening and closing of the valve.

SUMMARY OF THE INVENTION

The present invention provides a new and improved valve assembly including a housing having an interior space and an opening through which fluid can enter and exit the interior space, a valve body movable within the interior space between a completely opened position allowing fluid flow through the opening and a completely closed position preventing fluid flow through the opening, and a sleeve movable longitudinally along, and rotatably about, a longitudinal axis. The sleeve is connected to the valve body so that the valve body can rotate with the sleeve about the longitudinal axis between the completely opened position and an intermediate position where the valve body is substantially aligned with the opening but spaced longitudinally therefrom, and so that the valve body can move longitudinally with the sleeve between the intermediate position and the completely closed position.

One of the housing and the sleeve includes a cam surface, and the other of the housing and the sleeve includes a cam follower received by the cam surface. The assembly also includes a shaft extending along, and rotatable about the longitudinal axis of the sleeve, wherein the shaft is in screw-threaded engagement with the sleeve so that rotation of the shaft causes one of rotation and longitudinal movement of the sleeve with the cam follower.

Among other aspects and advantages of the present invention, the valve body of the valve assembly is provided with both rotational and longitudinal movement between the closed and the opened position. The valve assembly of the present invention also provides a resolution of the longitudinal movement that can be chosen independently of a resolution of the rotational movement of the valve body. Moreover, the present invention provides a new and improved pendulum valve assembly that supplies a more controllable and consistent change in conductance through the valve assembly during opening and closing of the valve.

Additional aspects and advantages of the present invention will become readily apparent to those skilled in this art from the following detailed description, wherein exemplary embodiments of the present invention are shown and described, simply by way of illustration of the best modes contemplated for carrying out the present invention. As will be realized, the present invention is capable of other and different embodiments and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference character designations represent like elements throughout, and wherein.

DETAILED DESCRIPTION OF EXEMPLARY EMBODIMENTS

Figure 1:
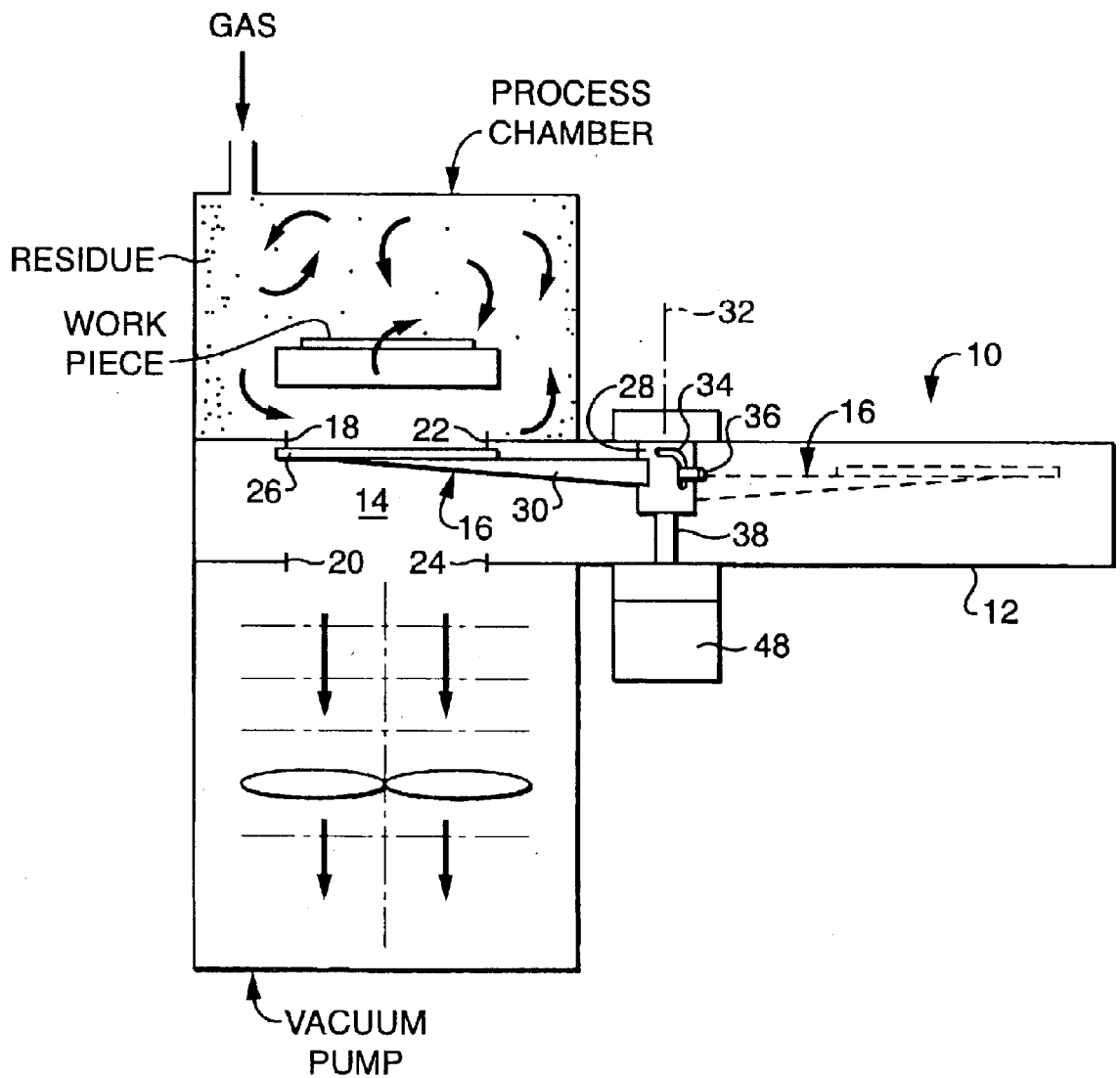
FIG. 1 is a schematic illustration of a portion of a high purity gas delivery system including an exemplary embodiment of a pendulum valve assembly constructed in accordance with the present invention and having a valve body rotationally and longitudinally movable between closed and open positions as shown.
Figure 2:
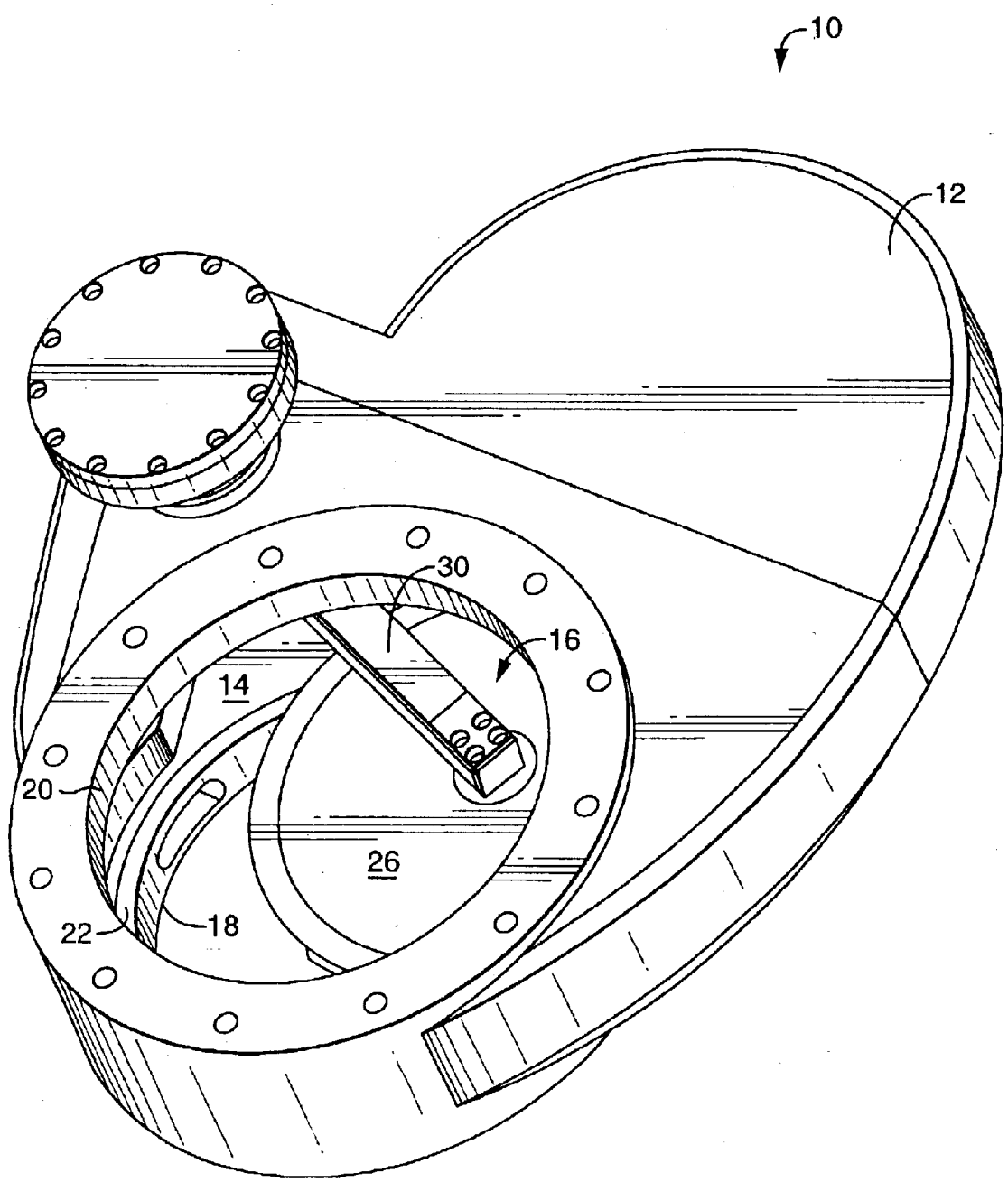
FIG. 2 is a perspective view of the pendulum valve assembly of FIG. 1.

Referring to FIG. 1, an exemplary embodiment of a pendulum valve assembly 10 constructed in accordance with the present invention generally includes a housing 12 defining an interior space 14 containing a pendulum valve 16 and having a pair of opposing openings 18, 20 through which gas can enter and exit the interior space. Valve seats 22, 24 are provided in the interior 14 of the housing 12 around edges of the openings 18, 20. As shown, the pendulum valve 16 includes a valve body 26 which is moved between a completely opened position allowing fluid flow through the opening 18, as shown in broken lines, and a completely closed position preventing fluid flow through the opening 18, as shown in solid lines.

As also shown, the first of the openings 18 of the pendulum valve assembly 10 can, for example, be connected to a process chamber and a second of the openings 20 can be connected to a vacuum pump to form a portion of a high purity gas delivery system, such as those used in semiconductor manufacturing or other thin film coating processes performed at very low pressures (high vacuums), e.g., a pressure on the order of one torr or less. In general, a work piece, such a semiconductor wafer, is placed in the chamber, while a process gas is introduce into the chamber to chemically react with the work piece in a predetermined manner. The chemical reaction may produce a residue, as shown.

The pendulum valve assembly 10 helps control the flow of gas between the process chamber and the vacuum pump by controlling the position of the disk 26 between the completely opened position and the completely closed position. When in the closed position the disk 26 comes into sealing contact with the valve seat 22 provided in the interior space 14 around the edge of the first opening 18.

Figure 3:
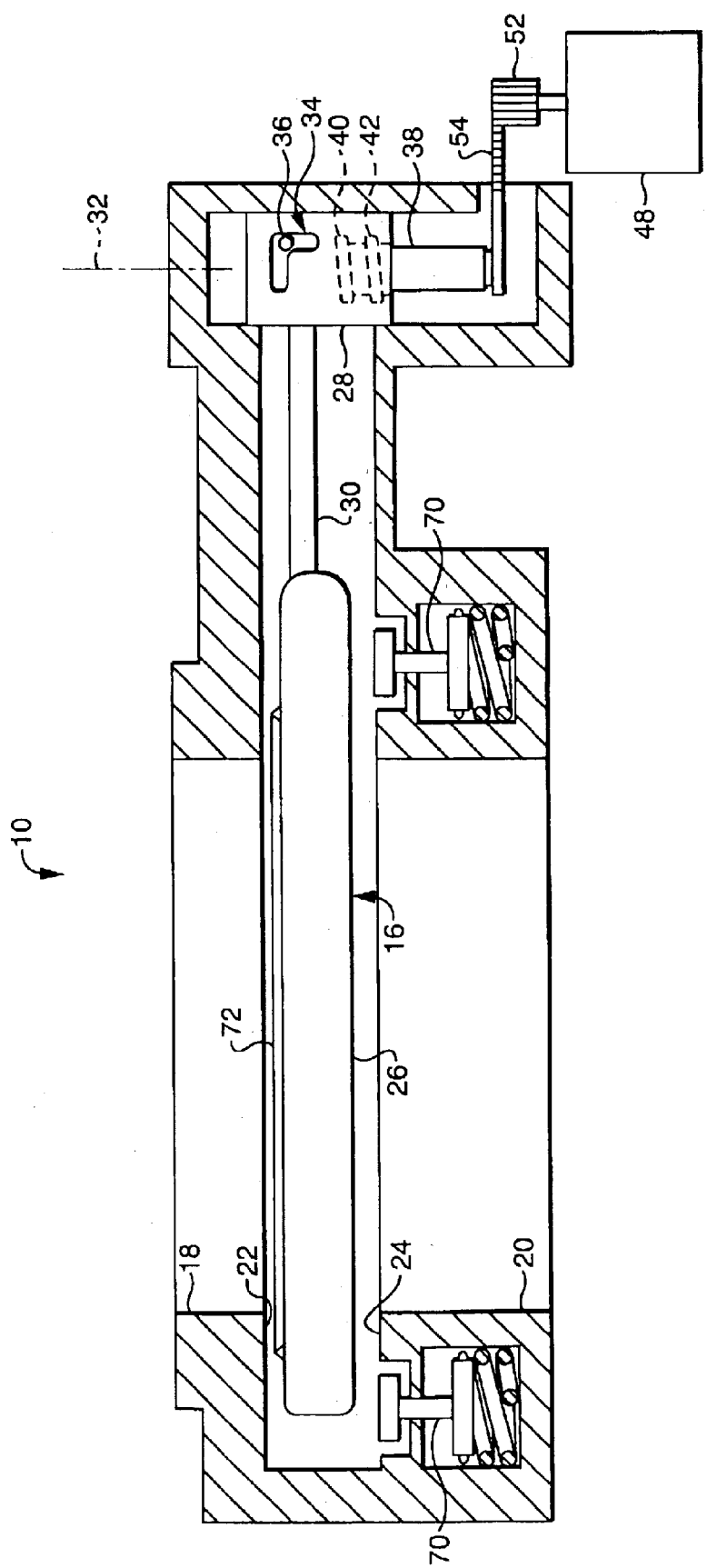
FIG. 3 is a sectional view of the pendulum valve assembly of FIGS. 1 and 2, with the valve body shown in an intermediate position.

Referring also to FIGS. 2 through 5, the present invention provides an arrangement that precisely controls rotational and longitudinal movement of the valve body 26 between the completely opened position and the completely closed position. In particular, and referring to FIGS. 3 through 5, the arrangement includes a sleeve 28 movable longitudinally along, and rotatably about, a longitudinal axis 32. The sleeve 28 is connected to the valve body 26 so that the valve body can rotate with the sleeve about the longitudinal axis 32 between the completely opened position and an intermediate position where the valve body 26 is substantially aligned with the opening 18 but spaced longitudinally therefrom, as shown in FIG. 3, and so that the valve body 26 can move longitudinally with the sleeve 28 between the intermediate position and the completely closed position. The sleeve 28 is connected to the valve body 26 through a pivot arm 30 that extends substantially normal to the axis 32.

One of the housing 12 and the sleeve 28 includes a cam surface 34, and the other of the housing and the sleeve includes a cam follower 36 received by the cam surface. The assembly 10 also includes a shaft 38 extending along, and rotatable about the longitudinal axis 32 of the sleeve 28, wherein the shaft is in screw-threaded engagement with the sleeve so that rotation of the shaft causes one of rotation and longitudinal movement of the sleeve with the cam follower 36.

In order to control the position of the disk 26, the assembly 10 is provided with a motor 48 and a gear mechanism mounted to the housing 12, as shown in FIG. 3. The motor 48 preferably is a reversible stepping motor and includes a motor shaft that is fixed to, or otherwise provided with, a first rotary gear 52 of the gear mechanism. Gear mechanism also includes a second rotary gear 54 which rotates opposite to the rotational movement of the first rotary gear 52 when the motor 48 drives the gear in a rotational direction. The second rotary gear 54 is fixed to an end of the longitudinal shaft 38 of the pendulum valve 16.

The shaft 38 is longitudinally fixed with respect to the sleeve 28. As shown best in FIG. 5, the cam sleeve 28 is provided with internal threads 40 that engage external threads 42 of the shaft 38. In the exemplary embodiment shown, the external threads 42 are in direct contact with the internal threads 40. Alternatively, however, ball bearings could be provided between the external threads and the internal threads, i.e., a ball-screw arrangement. In any event, upon rotation of the shaft 38 the cam sleeve 28 normally moves longitudinally along the axis 32. If, however, the cam sleeve 28 is prevented by the cam surface 34 and the cam follower 36 from moving longitudinally, then the cam sleeve 28 rotates with the shaft 38.

Figure 5:
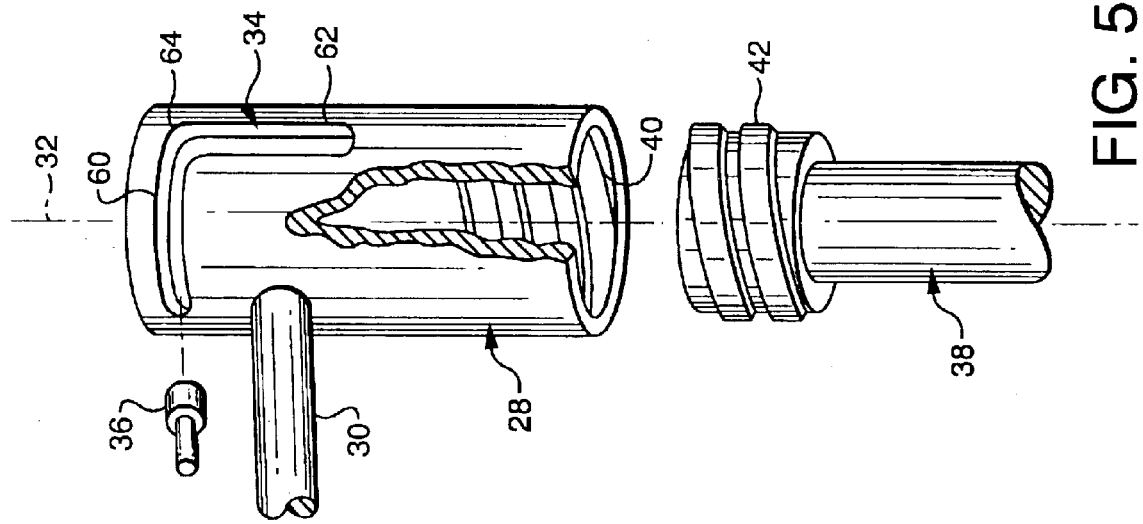
FIG. 5 is an explode side perspective view of the cam follower, the cam sleeve, and the screw shaft of the pendulum valve assembly of FIGS. 1 through 3, with a portion of the cam sleeve cut-away.
Figure 4:
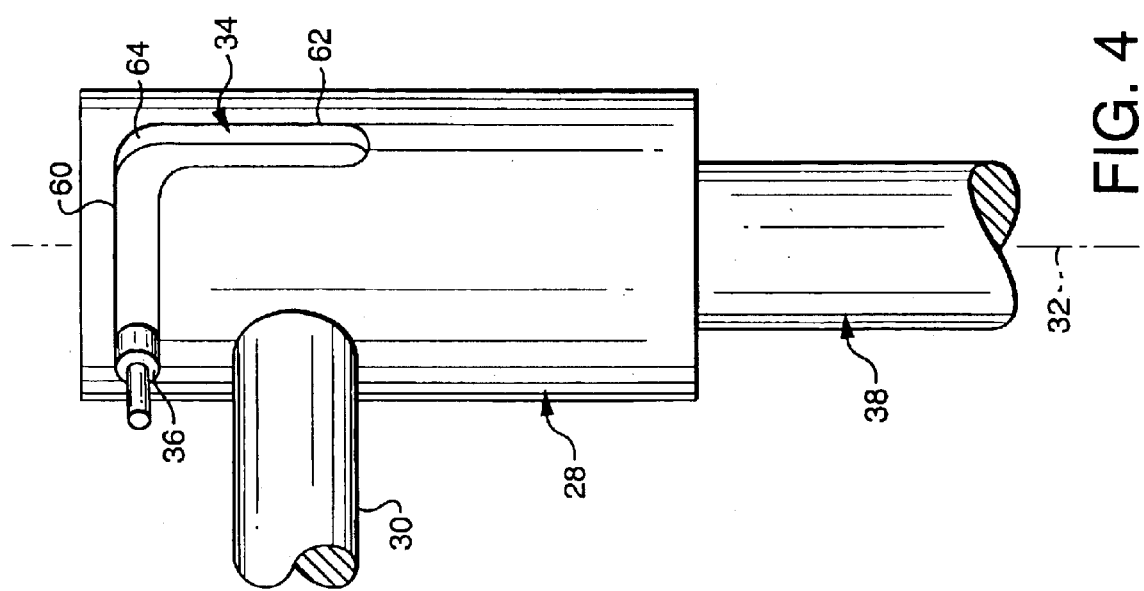
FIG. 4 is side elevation view of a cam follower, a cam sleeve, and a screw shaft of the pendulum valve assembly of FIGS. 1 through 3.

In the exemplary embodiment shown in FIGS. 3 through 5, the cam follower 36 is secured to the housing 12 in a position fixed with respect to the movable sleeve 28, and the cam surface 34 is provided in an outer side surface of the sleeve 28. As shown best in FIGS. 4 and 5, the cam surface 34 includes a laterally extending first portion 60, a longitudinally extending second portion 62, and an intermediate or transitional portion 64 connecting the first and the second portions. In general, therefore, the cam surface 34 is "L-shaped".

The laterally extending first portion 60 causes the sleeve 28 and the disk 26 to rotate in a plane parallel to the first opening 18, rotating from the fully open position (as shown in broken lines in FIG. 1) to an intermediate position where the disk 26 is substantially aligned with the first opening 18, as shown in FIG. 3. The disk 26 moves within the parallel plane because the first portion 60 of the cam surface 34 follows the cam follower 36 in a purely rotational movement upon rotation of the shaft 38. The sleeve 28 is prevented from moving longitudinally by the cam follower 36, as the first portion 60 moves over the cam follower 36.

The longitudinally extending second portion 62 of the cam surface 34, however, causes the sleeve 28 and the disk 26 to move parallel with the sleeve axis 32 towards the first opening 18 until the disk 26 engages the valve seat 22 (as shown in solid lines in FIG. 1). The sleeve 28 is prevented from rotating by the cam follower 36, as the second portion 62 moves over the cam follower 36.

The transitional portion 64 of the cam surface 34 extends both longitudinally and laterally, such that it causes a combination of both rotary movement and longitudinal movement of the sleeve 28 and the disk 26. In the exemplary embodiment shown, the transitional portion 64 of the cam surface 34 is provided with a curved shape, but could also be provided with straight shape if desired. The screw shaft 38, the cam sleeve 28, the cam surface 34 and the cam follower 36 thus provide a new and improved, yet simple and effective arrangement for providing rotational and longitudinal movement of the pendulum valve 16. The valve assembly 10 of the present invention also provides a resolution of the longitudinal movement of the valve body 26 that can be designed independently of a resolution of the rotational movement of the valve body 26, simply by changing the length of the first portion 60 of the cam surface 34, the length of the second portion 62 of the cam surface, the length and the curvature of the transitional portion 64 of the cam surface, or the pitch of the screw threads 40, 42.

As shown in FIG. 3, the assembly 10 can further include spring loaded pistons 70 arranged to bias the valve body 26 longitudinally against the valve seat 22 of the first opening 18 when the valve body is substantially moved to the fully closed position. An O-ring 72 is provided on the disk 26 to provide a seal between the disk and the valve seat 22.

Although not shown, the assembly 10 can include a second valve body movable within the housing 12 between a completely opened position allowing fluid to pass through the second opening 20 and a completely closed position wherein fluid can not pass through the second opening 20. An example of such an arrangement is show in U.S. Pat. Nos. 6,328,051 and 6,409,149, which are both assigned to the assignee of the present invention and have been incorporated herein by reference. The assembly 10 can also be provided with an annular cover movable between a covered position wherein the cover protects the valve seat 24 of the second opening 20 and an uncovered position wherein the cover is spaced from the second opening so a second valve body can engage the valve seat 24 of the second opening 20. An example of such an arrangement is show in U.S. Pat. No. 6,409,149.

It should be appreciated that various changes can be made without departing from the scope of the invention. For example, while the cam surface 34 is provided in the cam sleeve 28 and the cam follower 36 is secured to the housing 12, the arrangement can be reversed.

Figure 6:
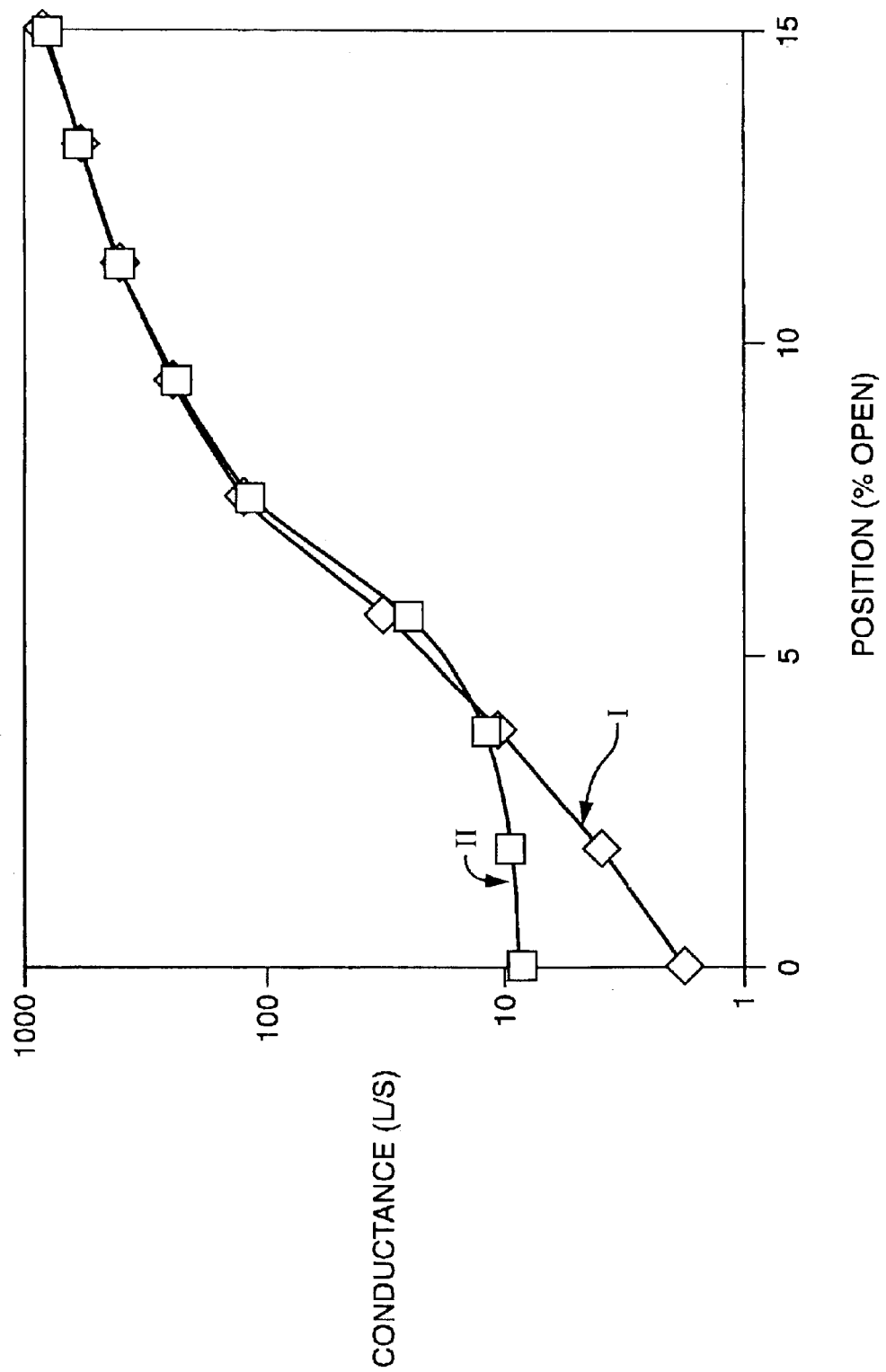
FIG. 6 is a graph of conductance through a valve assembly versus a percentage that the valve assembly is open, showing a comparison between an existing valve assembly and a valve assembly constructed in accordance with the present invention.

FIG. 6 is a graph of conductance through a valve assembly versus a percentage that the valve assembly is open for a 200 mm valve, showing a comparison between an existing valve assembly, illustrated by line "II", and a valve assembly constructed in accordance with the present invention, such as the valve assembly 10 shown in FIGS. 1 through 5, illustrated by line "I". An example of an existing valve assembly is a Series 65 pendulum valve from VAT Vakuumventile AG of Haag Switzerland. As illustrated by the line "II" of the graph of FIG. 6, when the Series 65 pendulum valve is first opened, the flow through the valve changes little then transitions to a relatively rapid change in flow over a relatively small change in angle (4 to 6% open). This rapid change in the slope of the conductance curve results in poor control of conductance (and, thus, poor control of pressure within the process chamber).

As illustrated by the line "I" of the graph of FIG. 6, when the valve body 26 of the valve assembly 10 constructed in accordance with the present invention is first moved away from the fully closed position, the flow is allowed to increase with a relatively constant slope (conductance vs % opening) considering the log-linear relationship (e.g., about 7 L/S during the first 3.5%–4% of valve opening) by first increasing the axial gap between the valve body 26 and the valve seat 22 of the housing 12. At the same time, the valve body 26 is rotated so that the transition to main flow (which is considered to occur when the gate starts to clear the opening in the housing) will be smooth and maintain this constant slope during the transition. Since a valve assembly constructed in accordance with the present invention provides fine resolution of the longitudinal movement of the valve body 26 that can be designed independently of a resolution of the rotational movement of the valve body 26, the flow characteristics of the pendulum valve can be tailored to meet the requirements of the particular application of the valve. In the case of the application of the valve for the semiconductor industry, for example, the requirement is to have fine control near the closed position but have high conductance (flow) in the full open position, as illustrated by line I of the graph of FIG. 6. Among other benefits and features, therefore, the present invention provides a valve assembly that has a very high control range and has a smooth conductance (flow) curve as the valve body begins to be moved away from a fully closed position.

Thus, a new and improved pendulum valve assembly 10 constructed in accordance with the present invention has been described. In particular, the present invention provides a new and improved, yet simple and effective arrangement for providing motion of the disk 26 of the pendulum valve assembly 10 in at least two directions. The exemplary embodiments described in this specification have been presented by way of illustration rather than limitation, and various modifications, combinations and substitutions may be effected by those skilled in the art without departure either in spirit or scope from this invention in its broader aspects and as set forth in the appended claims. The valve assembly of the present invention as disclosed herein, and all elements thereof, are contained within the scope of at least one of the following claims. No elements of the presently disclosed valve assembly are meant to be disclaimed.

What is claimed is:

1. A valve assembly comprising:
    a housing including an interior space and an opening through which fluid can enter and exit the interior space;
    a valve body movable within the interior space of the housing between a completely opened position allowing fluid flow through the opening and a completely closed position preventing fluid flow through the opening;
    a sleeve movable longitudinally along, and rotatably about, a longitudinal axis, and wherein the sleeve is connected to the valve body so that the valve body can rotate with the sleeve about the longitudinal axis between the completely open position and an intermediate position where the valve body is substantially aligned with the opening but spaced longitudinally from the opening, and so that the valve body can move longitudinally with the sleeve between the intermediate position and the completely closed position, and wherein one of the housing and the sleeve includes a cam surface and the other of the housing and the sleeve includes a cam follower received by the cam surface for moving along and being guided by the cam surface; and
    a shaft extending along, and rotatable about the longitudinal axis of the sleeve, wherein the shaft is in screw-threaded engagement with the sleeve so that rotation of the shaft causes at least one of rotation and longitudinal movement of the sleeve against the cam follower.

2. A valve assembly according to claim 1, wherein the cam sleeve is provided with internal threads and the shaft is provided with external threads.

3. A valve assembly according to claim 1, the cam follower is secured to the housing in a position fixed with respect to the movable sleeve, and the cam surface is provided in an outer side surface of the sleeve.

4. A valve assembly according to claim 3, wherein the cam surface includes a first portion, a second portion, and a transitional portion connecting the first and the second portions.

5. A valve assembly according to claim 4, wherein the first portion of the cam surface extends laterally with respect to the longitudinal axis.

6. A valve assembly according to claim 4, wherein the second portion of the cam surface extends longitudinally with respect to the longitudinal axis.

7. A valve assembly according to claim 1, further including a motor coupled to the shaft for rotating the shaft.

8. A valve assembly according to claim 7, wherein the motor is coupled to the shaft through a gear mechanism.

9. A valve assembly according to claim 8, wherein the motor includes a drive shaft, and the gear mechanism includes a gear fixed to the motor drive shaft and a gear fixed to the shaft.

10. A valve assembly according to claim 1, wherein the valve body comprises a disk.

11. A valve assembly according to claim 10, wherein the disk has an O-ring for sealing engagement with the interior of the housing around the opening.

12. A valve assembly according to claim 1, wherein the housing further includes a valve seat disposed in the interior space of the housing around an edge of the opening for receiving the valve body in the completely closed position.

13. A valve assembly according to claim 1, further comprising spring loaded pistons arranged to bias the valve body longitudinally against the first opening when the valve body is substantially moved to the fully closed position.

14. A valve assembly according to claim 1, further comprising a second opening in the housing and a second valve body movable within the housing between a completely opened position allowing fluid to pass through the second opening and a completely closed position wherein fluid can not pass through the second opening.

15. A valve assembly according to claim 14, further comprising an annular cover movable between a covered position wherein the cover protects a valve seat of the second opening and an uncovered position wherein the cover is spaced from the second opening so the second valve body can engage the valve seat of the second opening.

16. A system used to perform thin film coating processes, including the valve assembly of claim 1, and further comprising a vacuum pump connected to a process chamber through the valve assembly.

17. A valve assembly according to claim 1, wherein the cam sleeve is connected to the valve body through a pivot arm.

18. A valve assembly according to claim 17, wherein the pivot arm extends normal to the axis of the sleeve.

19. A valve assembly according to claim 1, wherein the opening is oriented such that an axis of the opening extends parallel with the axis of the cam sleeve.

20. A valve assembly according to claim 1, wherein the cam sleeve is provided with internal threads and the shaft is provided with external threads and the external threads are in direct contact with the internal threads.

21. A valve assembly according to claim 1, wherein the shaft is longitudinally fixed.

22. A valve assembly according to claim 1, wherein the cam surface is generally L-shaped.

23. A valve assembly according to claim 4, wherein the transitional portion of the cam surface extends longitudinally and laterally with respect to the longitudinal axis of the sleeve.

24. A valve assembly according to claim 4, wherein the transitional portion of the cam surface is curved.

* * * * *

UNITED STATES PATENT AND TRADEMARK OFFICE
CERTIFICATE OF CORRECTION

PATENT NO. : 6,776,394 B2
DATED : August 17, 2004
INVENTOR(S) : Paul D. Lucas

It is certified that error appears in the above-identified patent and that said Letters Patent is hereby corrected as shown below:

<u>Title page,</u>
Item [73], Assignee, should read -- MKS Instruments, Inc., Wilmington, MA (US) --

Signed and Sealed this

Twenty-first Day of December, 2004

JON W. DUDAS
*Director of the United States Patent and Trademark Office*